United States Patent [19]

Diner et al.

[11] Patent Number: 4,475,647
[45] Date of Patent: Oct. 9, 1984

[54] ROPE BUCKET ELEVATOR

[76] Inventors: Gerts Diner, 1314 Ocean Parkway, Apt. 4J; Liza Kremerova, 2050 18st Ave., both of Brooklyn, N.Y. 11230

[21] Appl. No.: 397,495

[22] Filed: Jul. 12, 1982

[51] Int. Cl.³ .............................................. B65B 17/36
[52] U.S. Cl. .................................................... 198/711
[58] Field of Search .................. 198/711, 850, 698, 699

[56] References Cited

U.S. PATENT DOCUMENTS 1,414,810  5/1922  Hudson ................................. 198/711
1,549,528  8/1925  Finlayson ............................ 198/711
2,571,811  10/1951  Andrews .......................... 198/698 X Primary Examiner—Joseph E. Valenza
Assistant Examiner—Dennis J. Williamson

[57] ABSTRACT

A rope bucket elevator has a drive with at least one drum, a transport part having a rope member, a plurality of buckets attached to said rope member, and a plurality of clamp members each connecting a respective one of the bucket members with the rope member, wherein the clamp member has a surface which faces toward a surface of the drum and is provided with a recess, in which at least a portion of an attachment for the clamp member is accommodated.

4 Claims, 5 Drawing Figures

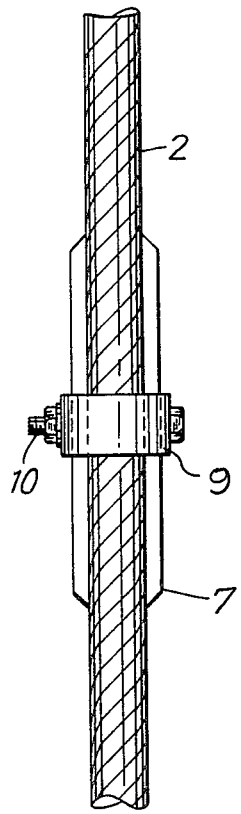
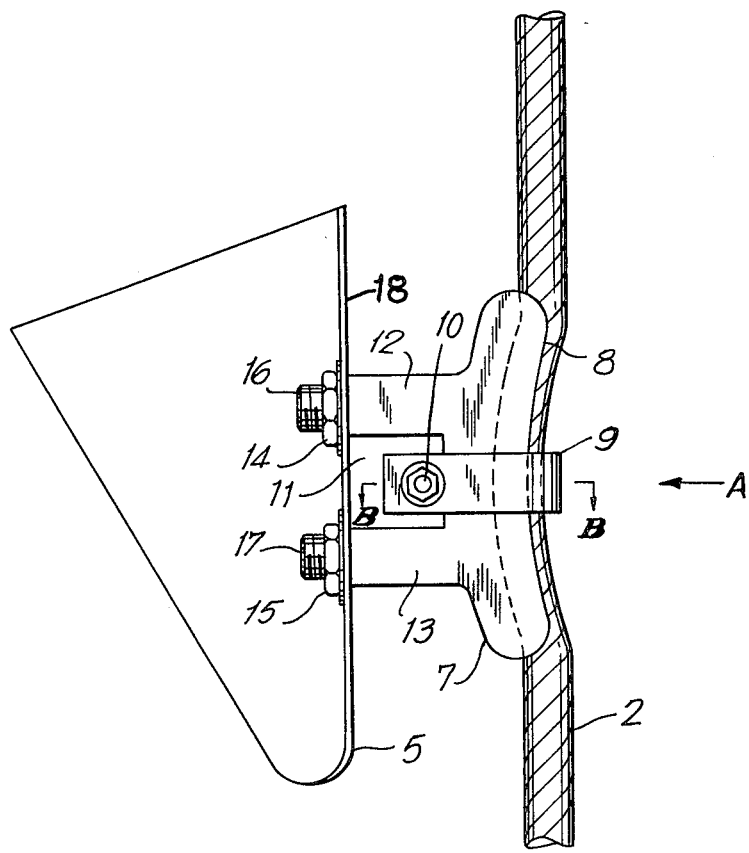
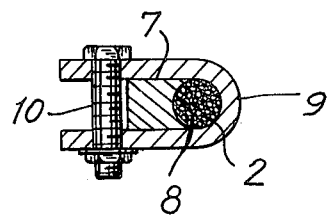

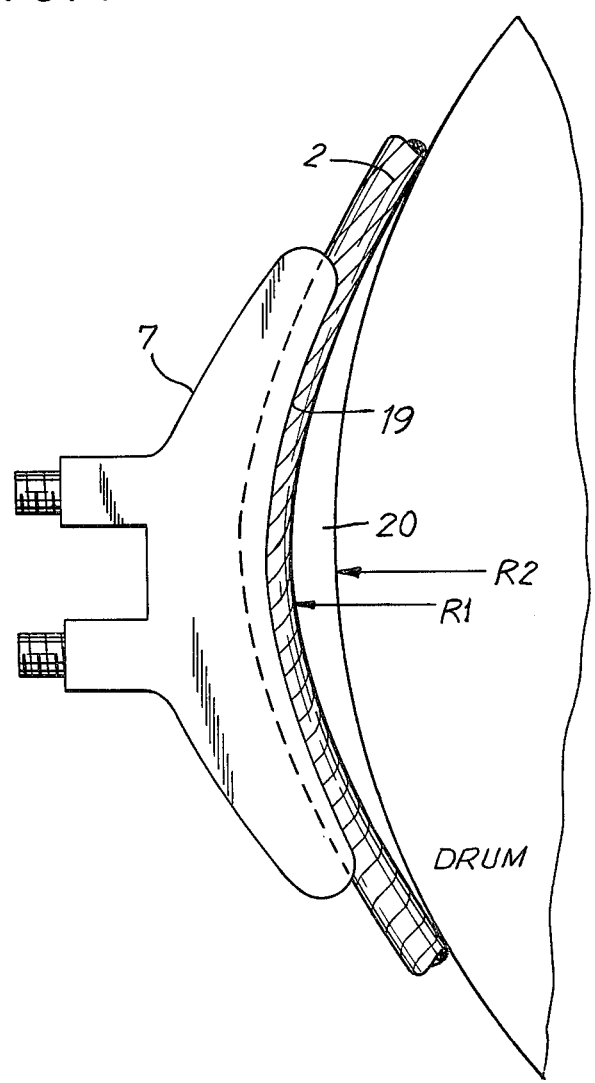

4,475,647

ROPE BUCKET ELEVATOR

BACKGROUND OF THE INVENTION

The present invention relates to bucket elevators for loose and lumpy materials, such as coal, schist, mine ore, cement, sand, gravel etc.

Bucket elevators are known in the art. In known bucket elevators belts or chains are used as a draught member. A rope draught member is also known and has the advantage in strength, height of hoist and lower cost of one unit length as compared with the belt or chain. The rope bucket elevator has a plurality of buckets mounted on a rope. Elevators are also disclosed in the U.S. Pat. Nos. 554,335, 1,234,764, 1,965,312, 4,227,609, 1,549,528. The constructions disclosed in these patents possess some considerable disadvantages.

SUMMARY OF THE INVENTION

Accordingly, it is an object of the present invention to provide a rope bucket elevator, which avoids the disadvantages of the prior art.

More particularly, it is an object of the present invention to provide a rope bucket elevator which avoids the disadvantages of the prior art in that it has sufficient strength, reliably retains the buckets and has a longer service life.

In keeping with these objects and with others which will become apparent hereinafter, one feature of the present invention resides, briefly stated, in a rope bucket elevator which has a rope member, a plurality of buckets, and a plurality of clamps connecting the buckets to the rope with an attachement element, partially accommodated in a recess, provided between the clamp and a drum of the drive.

When the above mentioned recess is retained between the clamp of each bucket and the drum, a very reliable attachement device can be provided, so that the buckets are reliably held on the clamps, and the clamps are reliably held on the rope. Thus, the elevator has high strength, is reliable in operation and has high service life, and the rope is easier to replace.

The novel features of the invention are set forth in the appended claims. The invention itself will be best understood from the specification and the drawing.

BRIEF DESCRIPTION OF THE DRAWING

FIG. 2 is an enlarged view of a fragment of the inventive elevator in the region of mounting of one of its buckets;

FIG. 3 is a section taken along the line B—B in FIG. 2;

FIG. 4 is a view from the rope side of a fragment of the elevator, as seen in direction of the arrow A in FIG. 2; and FIG. 5 is a view schematically showing running of a mounting member over a drum in the inventive elevator.

DESCRIPTION OF A PREFERRED EMBODIMENT

Figure 1:
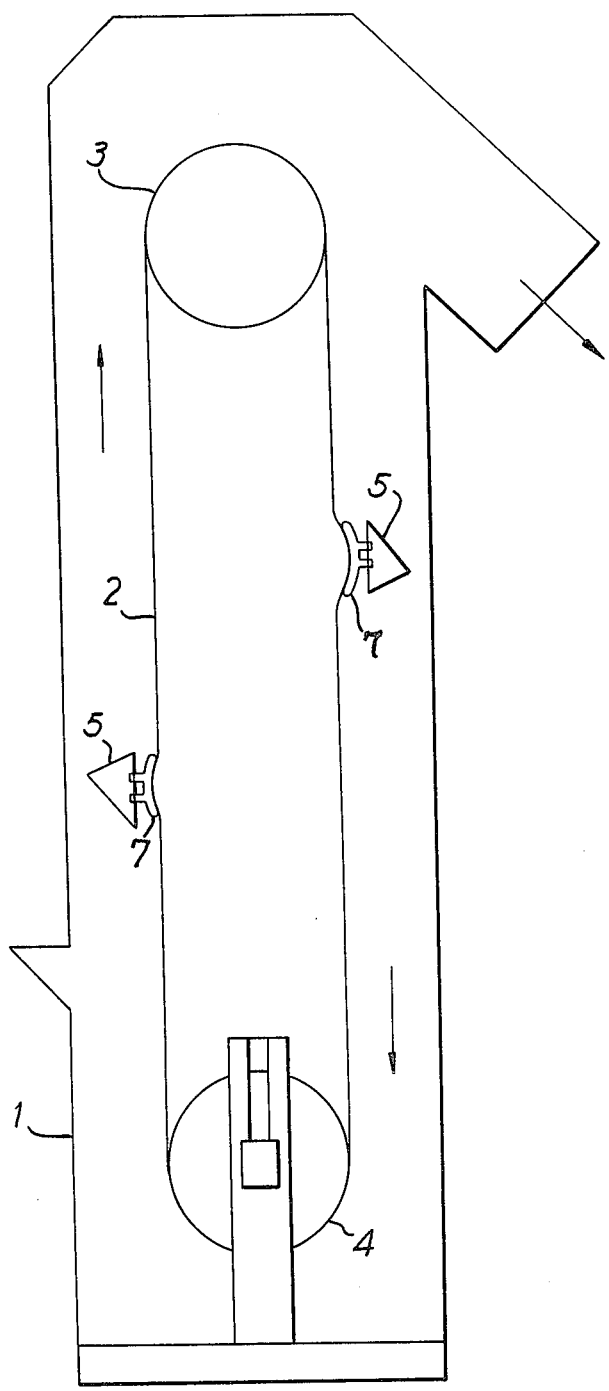
FIG. 1 is a schematic view showing a rope bucket elevator in accordance with the present invention.

A rope bucket elevator in accordance with the present invention has a body 1, a rope 2, a driving station 3, and a tensioning station 4 provided with drums of predetermined diameters. A draught member (the rope) is connected with buckets 5, 6 by clamps 7, as can be seen in FIG. 1.

A plurality of clamps 7 are provided for connecting buckets 5 of the elevator with the rope 2 of the same. Each clamp 7 has a groove 8 at its one side, in which the rope 2 is partially received. A bracket 9 has a bent portion, which surrounds the rope 2 and two leg portions extending from the bent portion. The leg portions of the bracket 9 surround and abut against the lateral sides of the clamp 7. They also project beyond the transverse cross section of the clamp 7, so as to form a hollow therebetween.

In the regions, in which the leg portions of the bracket 9 extend beyond the clamp 7, the leg portions are connected with one another by a bolt 10 with a nut screwed on the end of the bolt. The central part of the bolt extends through the hollow 11 between the leg portions.

The above described connection of the clamp 7 to the rope 2 is performed in the region of a body part or base of the clamp. The clamp 7 has two legs, 12 and 13, which extend from the body part or base and have threaded portions 16 and 17. The threaded portions 16 and 17 extend through openings in the wall of the bucket 5, so that the wall of the bucket abuts against shoulders, formed between the portions 12, 13 and the portions 16, 17. The bucket is fixed on the portions 16 and 17 by nuts 14 and 15, screwed thereon.

The clamp 7 has at its side, facing toward the rope and toward the drums of the stations (when passing the same), a recess identified by reference numeral 20. The recess 20 is so shaped that it remains free when the clamp passes over the drum. This makes possible to accommodate a part of attaching means, particularly the bent portion of the U-shaped bracket in the thus formed free space. In the event if other attachement means is utilized, in this free space parts of the latter mentioned attaching means can also be accommodated. More particularly, the above mentioned free space is formed because the diameter of the inner surface 19 of the bracket is smaller than the outer diameter of the drum.

Because of the thus formed free space, the attaching means may be designed with high strength, which provides for reliable mounting of the buckets, higher strength of connection, and longer service life. It also makes possible easy mounting of the buckets and dismounting of the same.

The clamp is further provided on the exterior side with bevels 18 for passing through grooves, as can be seen all from FIG. 2, on the drums or wheels on the inventive rope bucket elevator.

The invention is not limited to the details shown, since various modifications and structural changes are possible without departing in any way from the spirit of the present invention.

What is desired to be protected by Letters Patent is set forth in particular in the appended claims.

We claim:

1. A rope bucket elevator comprising:
   a. a drive means, including at least one drive wheel having a predetermined radius;
   b. a tensioning wheel having a radius approximately equal to said predetermined radius;
   c. an elongated endless band of rope disposed about the peripheries of the drive and tensioning wheels so that portions of an inner surface of the rope are in close abutting relationship with peripheral surface sections of each of said wheels, respectively, said wheels being sufficiently spaced apart to eliminate substantially all slack from the rope;

d. a plurality of buckets spaced along the rope and attached thereto by individual clamp assemblies, each said assembly including:

(i) a clamp having a bowed base with a radius of curvature less than said predetermined radius, said base also having lateral surfaces and a bottom surface with a logitudinal groove centered along substantially its entire length, said groove being adapted for receiving and accommodating a section of the rope, and said base having in addition a pair of elongated, spaced legs of one piece with a top surface thereof and extending away from said top surface; and (ii) a U-shaped bracket having a bent portion with a pair of spaced legs extending therefrom, said bracket being oriented with its bent portion in firm abutting contact with an inner surface of a section of the rope while an outer surface of said section is snugly received in and accommodated by said groove, and with its legs extending adjacent to the respective lateral surfaces of the clamp base and having end regions extending beyond the upper surface of said base and lying in a plane that extends between the clamp legs;

e. means for rigidly attaching a rear wall of each bucket to the clamp legs; and f. means for tightly securing the end regions of the bracket legs so that the rope section is snugly wedged between the groove in the clamp base and the bent portion of the bracket, said clamp assemblies being adapted for permitting smooth and rapid continuous motion of the buckets around the drive and tensioning wheels with a recess being formed between the bottom surface of each clamp base and the peripheries of each of said wheels, so that material can be loaded in the buckets at a bottom point of their path around the rope and emptied at some other point along said path.

2. A rope bucket elevator according to claim 1 wherein said clamp base is provided with longitudinal edge bevels on its bottom surface, said bevels cooperating with peripheral grooves on the drive or tensioning wheels as the clamp assembly passes around the peripheries of said wheels.

3. A rope bucket elevator according to claim 1 wherein said clamp base has rounded end edges.

4. A rope bucket elevator according to claim 1 wherein said means for rigidly attaching a rear wall of each bucket to the clamp legs includes a reduced diameter threaded portion on the terminus of each of said legs, each of which extends through an opening in the rear wall of the bucket so that said wall abuts against a shoulder formed between each of said reduced diameter portions and the remainder of said legs, said threaded reduced diameter portions being secured by rotatable threaded securing elements.

* * * * *